US011526666B2

(12) United States Patent
Sanghavi et al.

(10) Patent No.: US 11,526,666 B2
(45) Date of Patent: Dec. 13, 2022

(54) TRANSIENT PANEL ENABLING MESSAGE CORRECTION CAPABILITIES PRIOR TO DATA SUBMISSION

(71) Applicant: Apple Inc., Cupertino, CA (US)

(72) Inventors: Mehul K. Sanghavi, Sunnyvale, CA (US); Swati J. Deo, Fremont, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/153,158

(22) Filed: Oct. 5, 2018

(65) Prior Publication Data

US 2019/0050387 A1 Feb. 14, 2019

Related U.S. Application Data

(63) Continuation of application No. 13/562,489, filed on Jul. 31, 2012, now abandoned.

(51) Int. Cl.
*G06F 40/232* (2020.01)
(52) U.S. Cl.
CPC .................. *G06F 40/232* (2020.01)
(58) Field of Classification Search
CPC .............................. G06F 17/273; G06F 40/232
See application file for complete search history.

(56) References Cited

U.S. PATENT DOCUMENTS

| | | | |
|---|---|---|---|
| 6,064,959 A | * | 5/2000 | Young ..................... G10L 15/22 704/251 |
| 7,207,004 B1 | | 4/2007 | Harrity |
| 7,296,019 B1 | | 11/2007 | Chandrasekar |
| 8,490,022 B2 | | 7/2013 | Stone |
| 9,465,793 B2 | * | 10/2016 | Hoover ................. G06F 40/211 |
| 2002/0107928 A1 | | 8/2002 | Chalon |
| 2004/0111475 A1 | | 6/2004 | Schultz |
| 2005/0283726 A1 | * | 12/2005 | Lunati ................... G06F 17/273 715/257 |
| 2006/0084501 A1 | | 4/2006 | Walker |
| 2008/0126986 A1 | | 5/2008 | Tsukiji |
| 2009/0144651 A1 | * | 6/2009 | Sprang ................. G11B 27/034 715/800 |
| 2009/0254818 A1 | | 10/2009 | Jania |
| 2011/0202836 A1 | | 8/2011 | Badger |
| 2012/0127523 A1 | * | 5/2012 | Terashita .............. G06F 3/1285 358/1.15 |
| 2013/0151956 A1 | | 6/2013 | Allen |

* cited by examiner

*Primary Examiner* — Jennifer N Welch
*Assistant Examiner* — Ashley M Fortino
(74) *Attorney, Agent, or Firm* — Blank Rome LLP

(57) ABSTRACT

A programmable device such as a smart phone allows a user an opportunity to make final corrections to textual data in a message after the user has instructed the device to send the message, but before transmittal of the message. The opportunity is temporary, to avoid impeding the flow of communication, and the textual data is transmitted unmodified if the opportunity to modify it is not accepted. Modifications made during the opportunity period may be used to adapt an autocorrect functionality of the programmable device.

17 Claims, 8 Drawing Sheets

TRANSIENT PANEL ENABLING MESSAGE CORRECTION CAPABILITIES PRIOR TO DATA SUBMISSION

BACKGROUND

This disclosure relates generally to the field of electronic messaging. More particularly, but not by way of limitation, it relates to techniques for enabling message correction prior to actual transmission of the message.

For most users the autocorrect feature on mobile devices is a great feature. Autocorrect helps users who type fast on mobile devices with a very critical error proofing feature. Autocorrect also helps speed up typing as users who get part of a typed word may get to the full word without typing the full word before moving on to the next word in the sentence. However, the feature has its shortcomings.

Autocorrect typically offers a dictionary based keyword check when the user is typing a message. However, autocorrect is unable to provide useful corrective actions in certain situations. For example, autocorrect may be able to check and correct words based on simplistic grammar rules. However, a sentence or a message constructed in the mobile or instant messaging environment may use different rules as the users engaging in the conversation may use shorthand or other wording which may be understood between themselves depending on the subject and the context. This particular problem is magnified in the mobile messaging environment where the amount of real estate available for typing messages is severely constrained. Furthermore, nearly every sender of a text message has discovered an error in the message only after sending the message, such as when an unnoticed autocorrection or autocompletion has changed a word to something unintended, usually changing the meaning of the message considerably. Entire websites are devoted to some of the funnier unintended corrections that were sent mistakenly.

In another example, as more users in non-English speaking countries adapt to smartphones and tablets for internet access and communication, transliteration between users for the Short Messaging Service (SMS), commonly known as texting, has become very prevalent. Transliteration is defined as representing or spelling text in the characters of another alphabet. For example, Hindi is traditionally written in the Devanāgarī alphabet, but may be transliterated into the Latin alphabet.

In the messaging context, users find it convenient to write certain non-English language terms and colloquial words in otherwise English text. (Similar actions may be performed in any local language.) For example, in colloquial transliterated Hindi, the word for "Friend" is "Yaar," which will be used very commonly between native Hindi speaking users. Such words can always be introduced into the user's local device words dictionary, but that dictionary cannot address every possible word or word combination in the local language. The Hindi term Yaar is typically converted by the autocorrect feature to Year and if the user is not paying attention, the message body will contain the converted word, which may change the meaning of the sentence considerably depending on the context. In certain cases the meaning of the sentence can result in an ominous tone, which the user is unable to correct as most messaging services do not offer a recall or a revert option. The only corrective action at this point is for the user to either (1) send a corrected sentence or (2) inform the other user that the intent of the word is not what was meant.

Text messaging is a very important communication method and given the constraints of the corrective features in a confined form factor, users should be provided with additional aid(s) to ensure that their typed messages are sent correctly in the message stream. However, those aids should not impede the user's ability to send messages quickly.

SUMMARY

A programmable device such as a smart phone allows a user an opportunity to make final corrections to textual data in a message after the user has instructed the device to send the message, but before transmittal of the message. The opportunity is temporary, to avoid impeding the flow of communication, and the textual data is transmitted unmodified if the opportunity to modify it is not accepted. Modifications made during the opportunity period may be used to adapt an autocorrect functionality of the programmable device.

A program storage device is disclosed. Instructions are stored thereon for causing one or more programmable control devices to receive an instruction to transmit a textual data; offer an opportunity through a user interface to modify the textual data after receiving the instruction and prior to transmitting the textual data; transmit the textual data unmodified if the opportunity is not accepted; modify the textual data responsive to received instructions if the opportunity is accepted, producing a modified textual data; and transmit the modified textual data.

Another program storage device is disclosed. Instructions are stored thereon for causing one or more programmable control devices to receive textual data in a textual input area of a user interface; autocorrect the textual data, generating an autocorrected textual data; receive an instruction to transmit the autocorrected textual data; offer a temporary opportunity to modify the autocorrected textual data after receiving the instruction to transmit and prior to transmitting the autocorrected textual data; transmit the autocorrected textual data unmodified if the opportunity is not accepted; modify the autocorrected textual data responsive to received instructions if the opportunity is accepted, producing a modified textual data; and transmit the modified textual data.

A programmable device is disclosed. The programmable device includes one or more programmable control devices; and a program storage device, coupled to the one or more programmable control devices, on which are stored instructions for causing the one or more programmable control devices to offer a temporary opportunity to modify a textual data after receiving and before performing an instruction to transmit the textual data; transmit the textual data unmodified if the opportunity is not accepted; modify the textual data if the opportunity is accepted, producing a modified textual data; and transmit the modified textual data.

A method is disclosed. The method includes receiving an instruction to send a textual data from a programmable device; offering an opportunity to modify the textual data before performing the instruction to send the textual data; modifying the textual data in a user interface of the programmable device responsive to received instructions if the opportunity is accepted; and transmitting the modified textual data from the programmable device.

A programmable device is disclosed. The programmable device includes one or more programmable control devices; a display, coupled to one or more of the programmable control devices; and a program storage device, coupled to the one or more programmable control devices, on which are stored instructions for causing the one or more programmable control devices to receive an instruction to transmit a textual data; display an opportunity to modify the textual data before performing the received instruction; display suggestions for modifying the textual data if the opportunity is accepted; transmit the textual data unmodified if the opportunity is not accepted within a predetermined time; modify the textual data responsive to received instructions if the opportunity is accepted, producing a modified textual data; and transmit the modified textual data.

DETAILED DESCRIPTION

Figure 1:
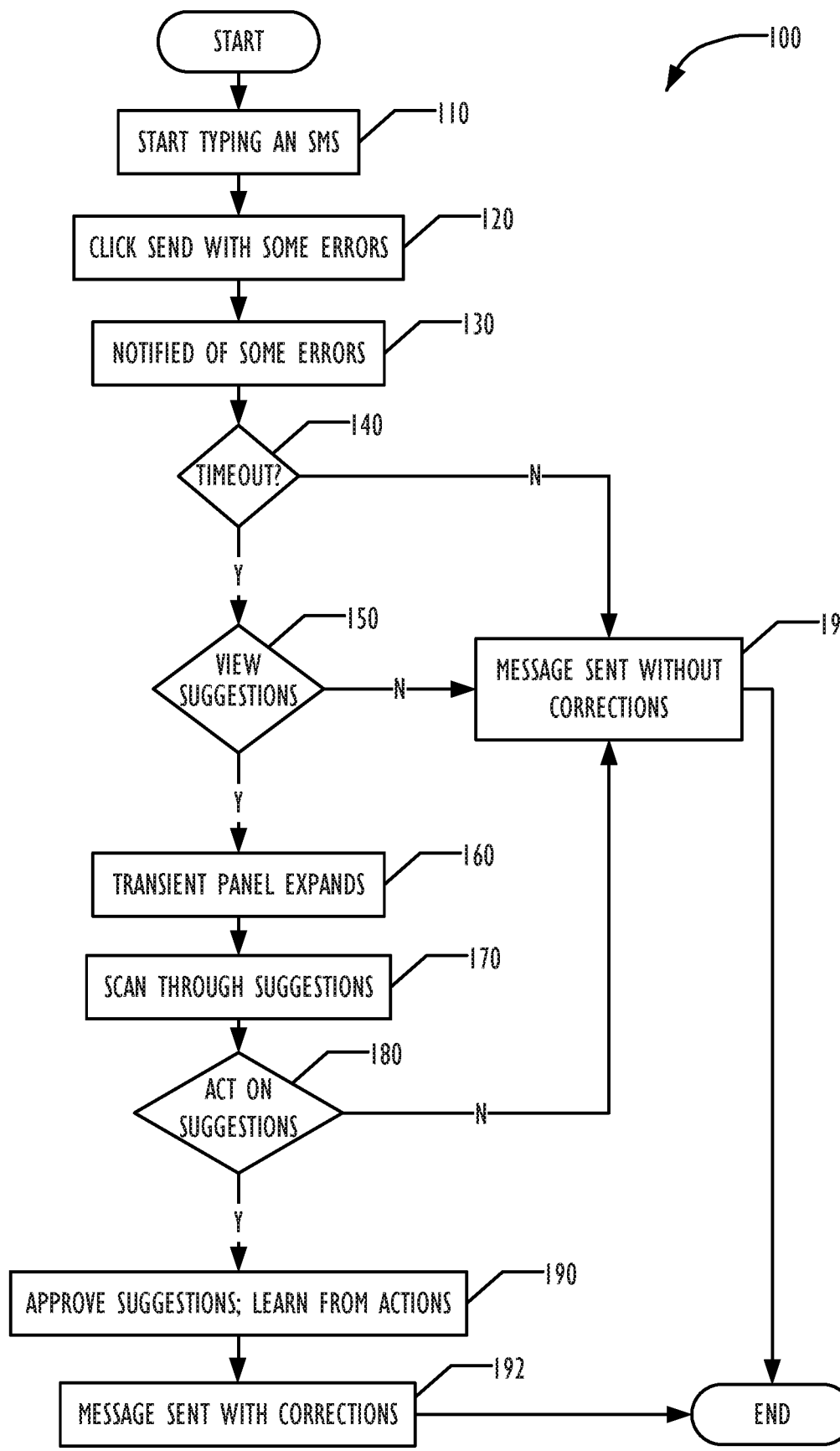
FIG. 1 is a flowchart illustrating a technique for providing an additional opportunity for correcting a text message before transmitting the message.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

The following description is written in terms of text messages, such as SMS messages. However, the techniques described herein are not limited to SMS messages, but may be employed any time that textual data may be entered by one user and transmitted to another user. For example, electronic mail (email) messages could make use of the described techniques, to allow a user to correct text in the email message, including recipient information, after instructing the transmittal of the email message, but before the actual transmittal of the message. Any electronic communication of textual data may employ the described techniques to help ensure correctness of the text.

The term textual data refers to characters that are entered using a user interface element, typically a physical or virtual keyboard for transmittal as an electronic communication to another user, however textual data may be entered using voice recognition techniques, as well. Typically, the textual data includes alphanumeric characters, but may include any character that may be entered using the user interface element. Although described below in terms of words and phrases, the textual data need not be composed of words in any known language, but may include any distinguishable sequence of characters, whether or not the sequence of characters appears in any dictionary or lexicon. When described as a "post-send" activity, the activity is one that is performed after the user has instructed the transmittal of the message, typically by interacting with a user interface element labeled as "Send" or some similar word.

Autocorrection is defined herein as a functionality of a programmable device that automatically analyzes textual data as it is entered, and either automatically modifies the text based on that analysis to correct spelling or other such errors or flags one or more words as being possibly in need of correction. Autocorrect functionality typically provides suggested replacements for words that the autocorrect functionality considers incorrect, such as suggesting "hte" should be corrected to "the" or automatically making that correction. In some implementations, this indication is a wavy line extending underneath the word, such as a red wavy line, visibly indicating the possible error, but other indication techniques may be used as desired. The autocorrect functionality typically depends upon an autocorrect dictionary, thus if the user enters text in a different language (e.g., transliterated Hindi while using an English autocorrect dictionary) or uses abbreviations or words unrecognized by the dictionary, the autocorrect functionality may indicate words as possible errors that are not errors or are what the user intended to type.

A similar functionality, typically referred to as autocomplete, predicts what word is intended by the user as the user begins typing the word, offering a way to entering the predicted word without having to type all of the characters.

Although the examples of the FIGS. 2-6 illustrate implementations in a smart phone, the techniques describe herein may be implemented in any desired programmable device.

FIG. 1 is a flowchart 100 illustrating a technique for performing a post-send activity to correct an electronic communication such as a text message after pressing "Send" but before actually sending the electronic communication. In block 110, the user begins typing the textual data of the message. While typing, an autocomplete functionality may assist the user's entry of the text, but may enter words unintended by the user if the autocomplete functionality prediction is incorrect. In addition an autocorrect functionality may indicate words that have been entered incorrectly, which the user may or may not notice, such as in the example of FIG. 2.

Figure 2:
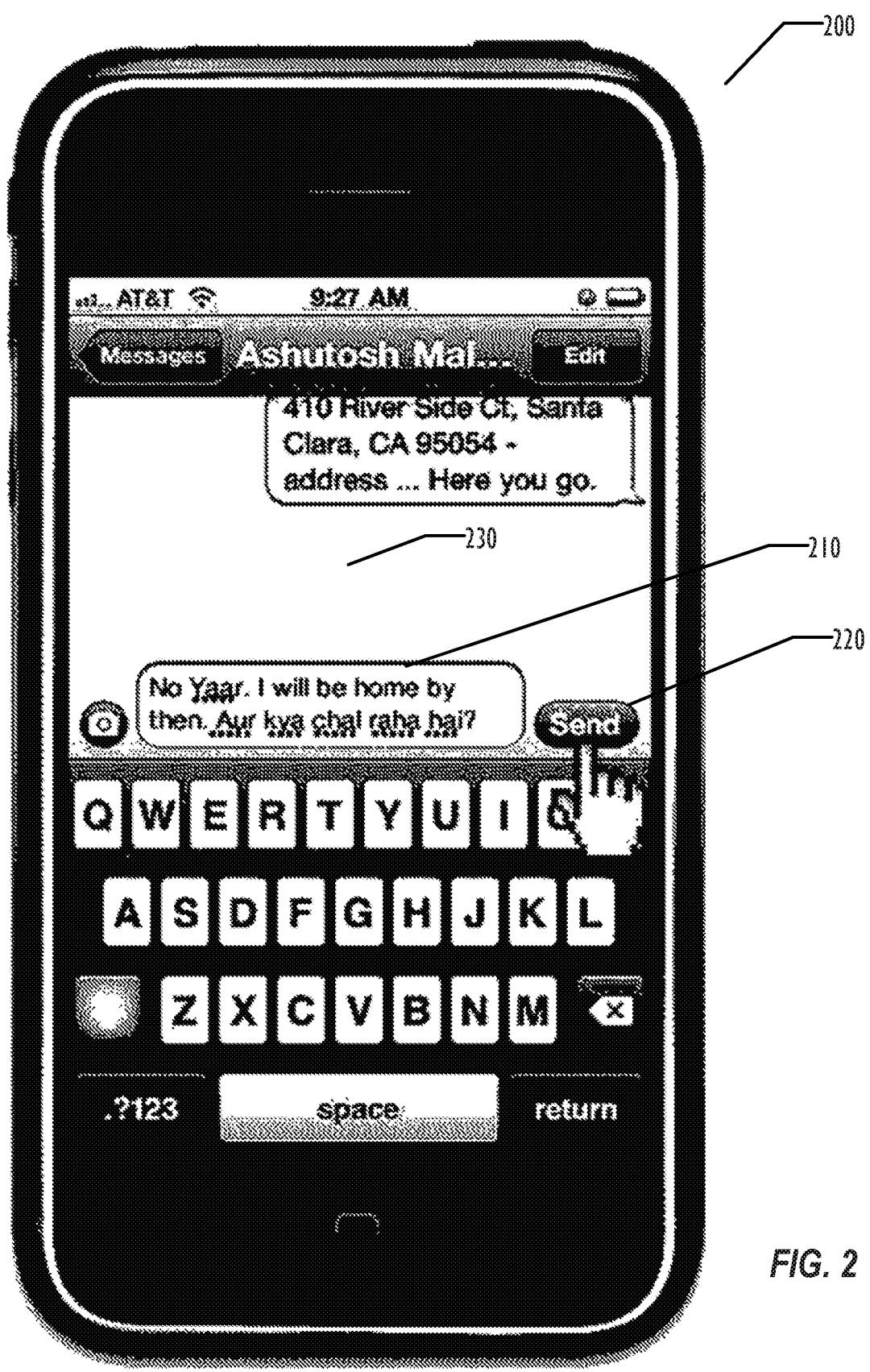
FIGS. 2-6 are front views of smart phone user interface elements for providing an opportunity for correcting a text message before transmitting the message.

In that example, a smart phone 200 provides a user interface for sending and receiving text messages. As illustrated in FIG. 2, an autocorrect functionality of the smart phone 200 has flagged the words "Yaar," "Aur," "kya," "chal," "raha," and "hai" in the textual data typed by the user in the text entry area 210. The smart phone 200 and user interface elements and arrangements thereof illustrated in FIGS. 2-6 are illustrative and by way of example only, and other programmable devices and user interface elements and arrangements may be used as desired. The user may accept suggestions from the autocorrect functionality, producing an autocorrected textual data In block 120, the user instructs the message to be sent by activating a user interaction element of the user interface of the programmable device, such as the "Send" button 220 illustrated in FIG. 2. Unlike conventional systems, which would immediately send the textual data as a message, in block 130, before actually transmitting the message, the system analyzes the textual data and notifies the user that there may be uncorrected errors in the message, offering an opportunity to correct those errors. This opportunity may be a temporary opportunity, to avoid impeding communication in a fast-moving texting session. The opportunity time period should be long enough to give the user a chance to respond, but not so long as to slow down communication excessively. For example, the opportunity may only last for a predetermined time of 1 or 2 seconds, although other lengths may be used as desired. Some implementations may allow the user to configure the length of the temporary opportunity. The programmable device 200 may further be configurable to disable or enable the post-send opportunity functionality if desired.

Figure 3:
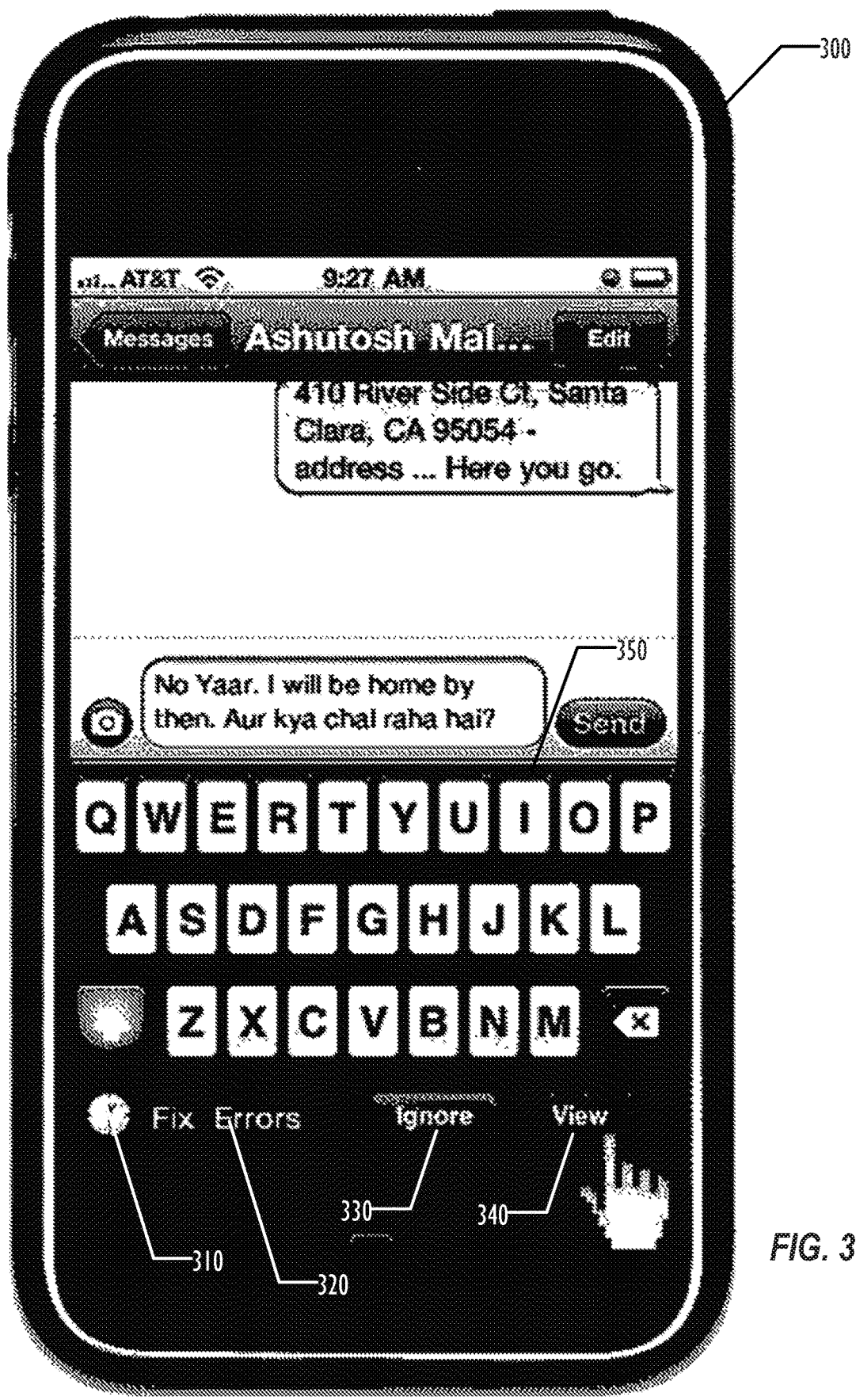

FIG. 3 is an example of the smart phone user interface of the smart phone 200 illustrating such a notification. As illustrated, four elements 310-340 are positioned below the keyboard area 350. These elements include a timer clock 310, a label "Fix Errors" 320, an Ignore (Reject) button 330, and a View (Accept) button 340.

The timer clock 310 provides an indication that the opportunity to modify the text of the message just sent (but not yet transmitted) will only last for a short time. Various techniques may be used for such an indication, such as coloring an increasing part of the clock face or moving hands of the clock to indicate the passage of time or how long the opportunity remains available. Other elements may use what appear to be one or more lights, instead of a clock face, so that the warning lights change color as time passes, such as going from green to red. Although referred to as lights, generally implementations will employ a display screen area that is colored as desired, rather than an actual separate light. Alternately, or in addition, the light area(s) may go from steady to flashing at an increasing rate to indicate that the opportunity is about to expire. These indicator techniques are only illustrative and by way of example, and any other technique for displaying an indication of the impending expiration of the correction opportunity may be used as desired.

In the example user interface for the device 200 of FIG. 3, a label area 320 provides a visual label to explain the purpose of the user interface elements that appear to indicate the temporary opportunity to correct the textual data. As illustrated, two user interaction elements 330 and 340 are displayed to allow the user to Ignore or reject (330) the opportunity to correct the textual data or to View or accept (340) the textual data and possibly correct it.

Returning to FIG. 1, in block 140 if the predetermined time expires without the user selecting either to ignore the opportunity to correct or to view the possible corrections, then the opportunity is retracted and the message may be transmitted to its recipient in block 194 without change. Similarly, should the user elect to ignore the opportunity and not view the suggestions, as determined in block 150, the message may be transmitted unchanged in block 194.

Figure 4:
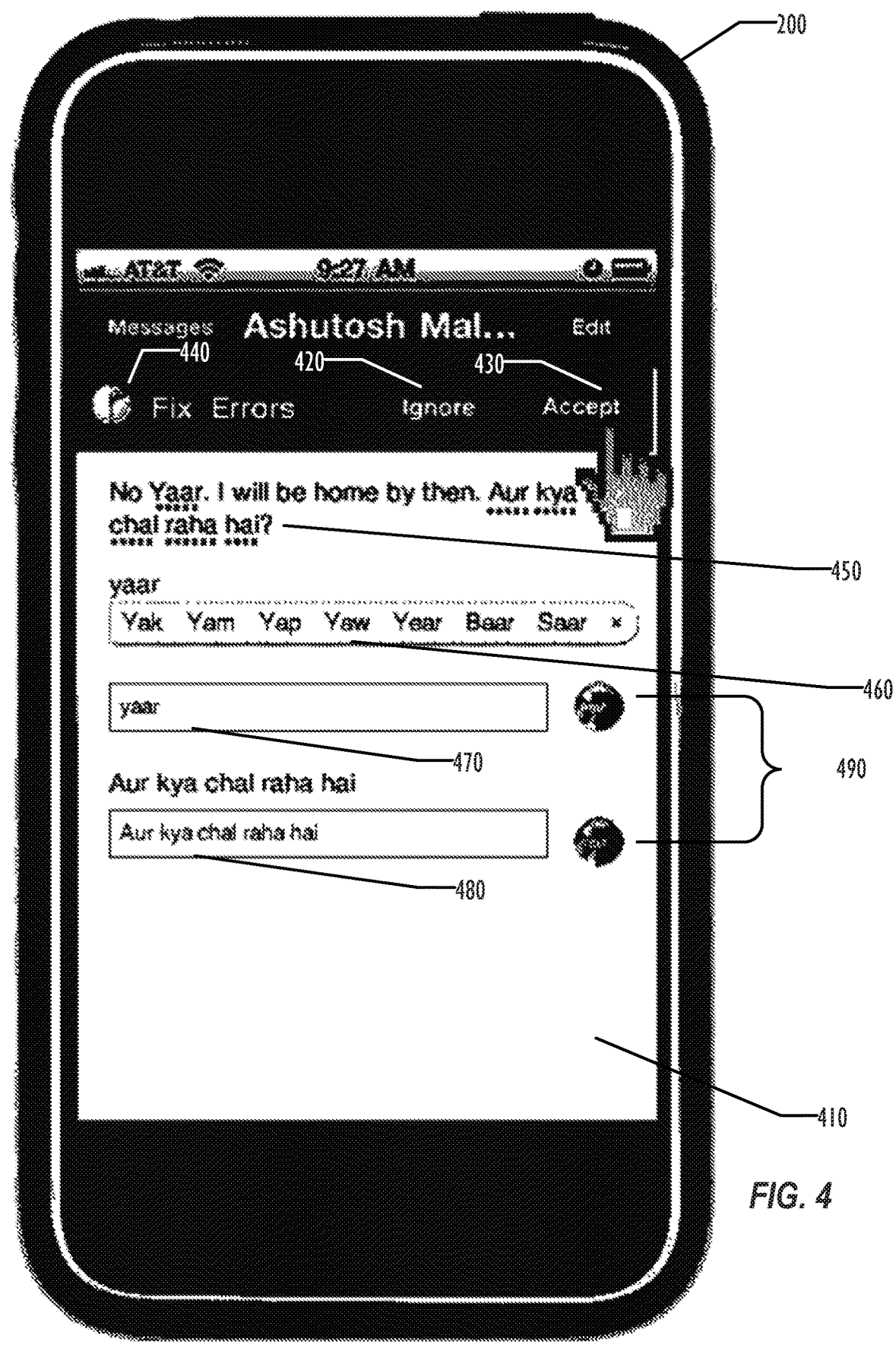

If the user elects to accept the opportunity and view the suggested changes by activating the user interaction element 340, as indicated by the hand pointing to the button 340, then in block 160 a transient panel such as the panel 410 illustrated in FIG. 4 may be displayed in the user interface of the device 200. The user may then scan through the suggestions in block 170 and provide instructions for modifying the textual data. In block 180, if the user has made any corrections, then in block 190 those corrections may be made to the textual data. In some implementations, if the user overrides the suggestions made by the autocorrect functionality in the transient panel 410, then the autocorrect functionality may be trained so that it learns to avoid suggesting corrections that the user chooses not to accept.

Finally, in block 192 the modified textual data may actually be transmitted to the intended recipient.

If no corrections are made in block 180, then in block 194 the unchanged textual data may be transmitted.

Figure 5:
Figure 6:
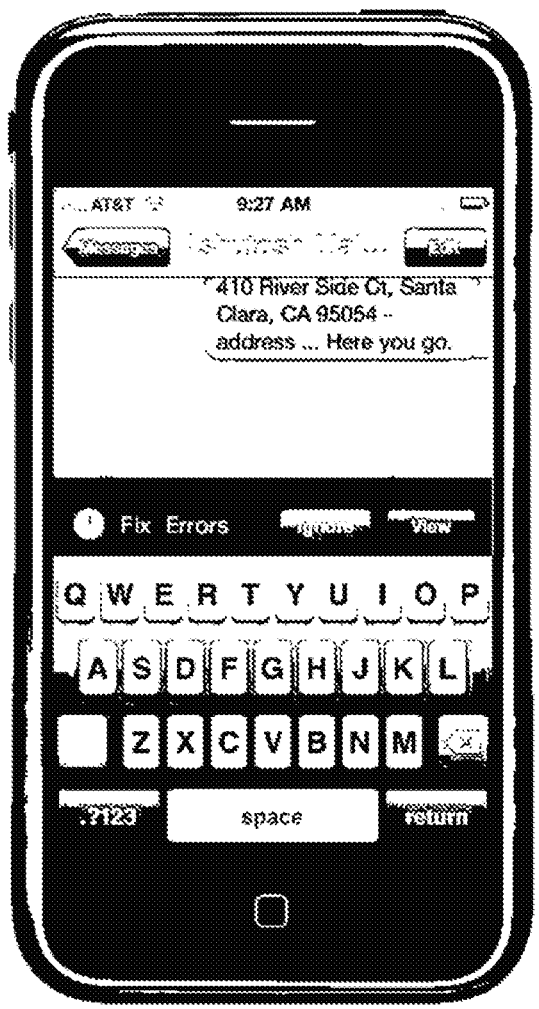

Whether or not any corrections were made, when the textual data is finally transmitted, the transient panel 410 may be removed from view, returning to the normal user interface of FIG. 5, showing the transmitted textual data as in area 510. Another message may now be typed into the entry area 210.

In some implementations, particularly with fast typing users, the programmable device 200 may queue up multiple messages for analysis and post-send correction before transmittal. In such an implementation, finishing the correction opportunity on a first message may pass that message off to be transmitted, but instead of returning to the base user interface screen 220 as in FIGS. 2 and 5, the user may return to transient panel 410 to view and accept or ignore suggestions for the next message in the queue, until all queued messages have been transmitted with or without correction. This would allow a fast typing user to queue up several messages for transmittal, then correct them sequentially, transmitting each message as it is accepted by the user.

Turning to FIG. 4, several user interface elements are illustrated in the transient panel 410. User interaction elements 420 and 430 allow the user to ignore or accept corrections and suggestions presented in the transient panel 410. A indicator 440 may optionally be included that is similar to the indicator 310 seen prior to accepting the opportunity to correct the textual data. The indicator 440 is static, indicating that the timer has stopped and that the transient panel 410 will remain viewable as long as desired, until the user activates either button 420 to ignore or reject the corrections or 430 to accept them. This allows the user sufficient time to decide how and whether to correct the textual data before the final submission.

In the example arrangement illustrated in FIG. 4, the textual data is displayed at the top of the panel 410 in area 450, with indications of which words the autocorrect functionality considers should be corrected. Below that, the first suggested correction is displayed in area 460, with the word as currently included in the textual data, together with a number of suggestions for alternatives to the original word, in this example suggesting replacing "Yaar" with one of "Yak," "Yam," "Yap," "Yaw," "Year," "Baar," or "Saar." If no suggested corrections exist in the autocorrect dictionary, then the list of alternate suggestions may be omitted. In addition, a text entry area 470 allows the user to replace the word with any new textual data that may be typed into the area 470.

Below the first suggested correction is an area 480 for retyping the phrase "Aur kya chal raha hai," for which the system of device 200 offers no suggested alternative. Both text areas 470 and 480 may be prefilled with the current textual data if desired to ease the corrective process. If one of the alternates from area 460 is accepted, it may replace the original text in the area 470.

Implementations may choose to consider words and phrases such as illustrated in FIG. 4 as transliterations, rather than ordinary spelling correction information, and store information about the transliterations in a separate dictionary from the main autocorrect dictionary. In such implementations, entire phrases or sentences may be learned and stored in the transliteration dictionary. Depending on the language currently active in the programmable device 200, implementations may disallow word by word autocorrection during the post-send opportunity, and only consider multiple word phrases as possible transliterations.

In this example beside each text area may be provided elements 490 which may be activated (such as by tapping on the appropriate element 490) to indicate that a correction has been accepted, such as by changing the color of the element 490.

Although only two textual data portions are shown for correction in FIG. 4, a message may contain any number of words or phrases for which suggestions to correct may be made. If more portions are indicated than will fit into the panel 410 at once, they may be scrolled or otherwise manipulated to see a varying subset of the portions at any given time, but allow the user access to all of the portions.

Although illustrated in FIG. 4 as comprising the entire display area, implementations may use less than the full screen for the transient panel. Alternately, the transient panel could be implemented inline with the textual data.

Any corrections made during the post-send opportunity that are accepted from suggestions to correct the textual data or entered directly by the user to modify the textual data may be analyzed and used by the autocorrect functionality of the programmable device 200 to learn the user's vocabulary and improve suggestions for future messages. Because the autocorrect functionality may be used for multiple applications in addition to the text messaging application, adapting the autocorrect functionality as described above may provide benefits to those other applications, as well.

The post-send correction capability may be configurable, allowing a user or administrator of the programmable device 200 to control the behavior of the programmable device 200 when performing the post-send activity described above. For example, an implementation may ignore words of less than a predetermined threshold length when determining which words to consider for offering corrective suggestions. An implementation may choose to bypass offering the opportunity to correct the textual data if none of the words in the textual data meet or exceed that threshold. Alternately implementations may only consider words that do not exceed a predetermined threshold length. These thresholds may be configurable if desired.

In addition, implementations may elect to offer the opportunity to correct the textual data only if it determines that a predetermined number of possible errors (words not contained in the autocorrect dictionary) or a predetermined number of correction suggestions identified by the autocorrect functionality in the textual data meets or exceeds a predetermined threshold number. In a programmable device 200 with a touch screen interface, if the strike area (the area where the user taps the interface to enter text) is small compared to the message display area, there is a greater likelihood of errors when entering the textual data. Implementations may allow configuring the threshold number of possible errors or suggestions. Alternatively, the opportunity may be offered only if at least a predetermined threshold portion of the textual data has been identified by the autocorrect functionality for possible correction.

Although described above as a post-send opportunity to correct the textual data, implementations may elect to provide the opportunity to correct the textual data using the transient panel prior to being instructed to send the textual data.

An implementation may be configured to provide the post-send opportunity to correct the textual data based upon the recipient's identity or whether the message is being sent to a group of people instead of a single recipient. Messages that are being broadcast to a group of people may need greater care than those sent to only a single recipient.

Implementation in an Electronic Device

Figure 7:
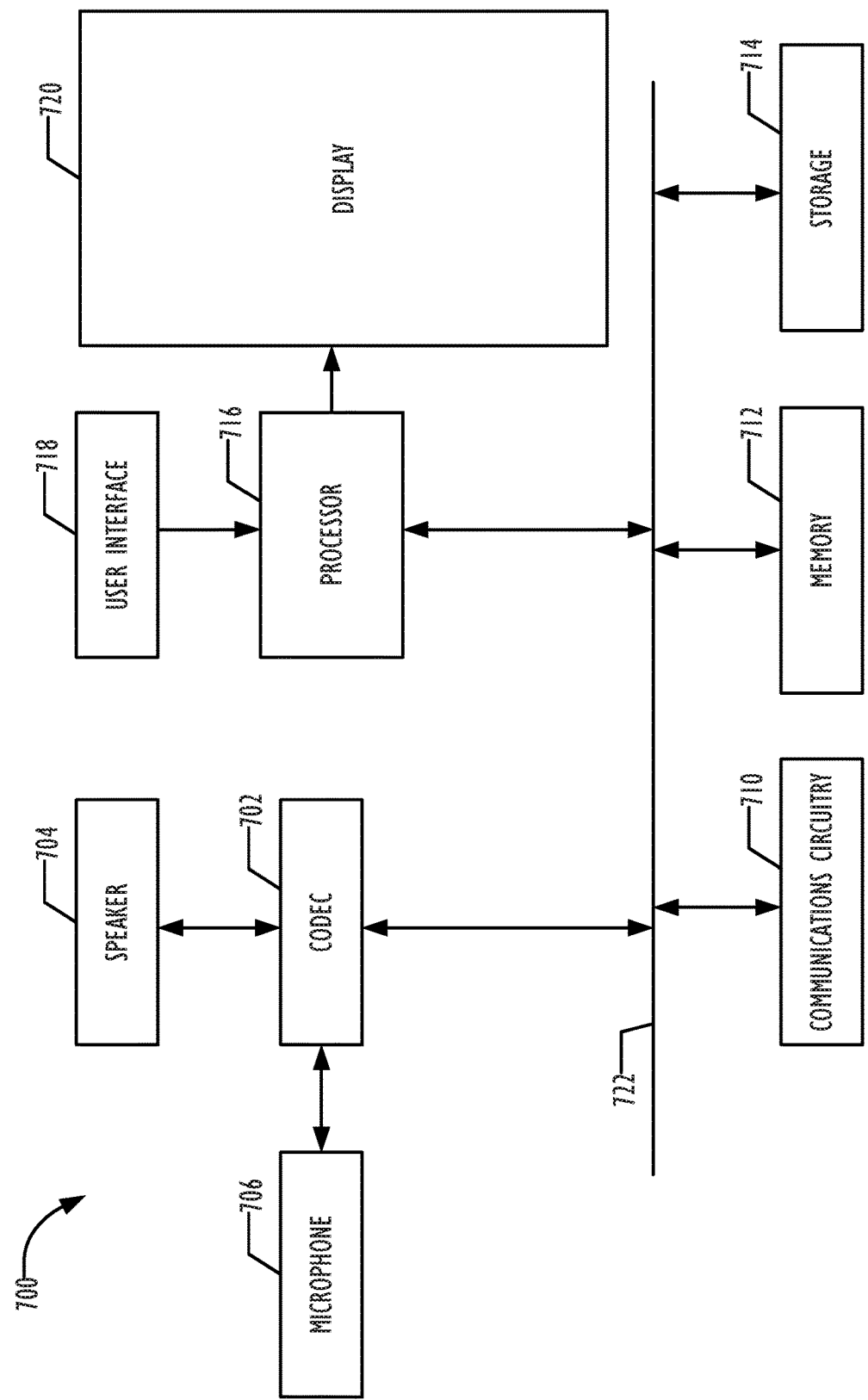
FIG. 7 is a block diagram illustrating a programmable device for performing the techniques disclosed herein.

FIG. 7 is a simplified functional block diagram illustrating an electronic device 700 according to one embodiment that can implement the techniques described above. The electronic device 700 may include one or more processors 716, display 720, microphone 706, audio/video codecs 702, speaker 704, communications circuitry 710, user interface 718, memory 712, storage device 714, and communications bus 722. Each processor 716 may be any suitable programmable control device and may control the operation of many functions, such as the generation and/or processing of image data, as well as other functions performed by electronic device 700. One or more processors 716 may drive display 720 and may receive user inputs from the user interface 718. Where multiple processors 716 are provided, the disclosed techniques may employ one or more of the processors 716 for performing any or all of the techniques, performing the techniques on only one of the multiple processors 716 or on multiple processors 716 as desired. The one or more embedded processors 716 provide versatile and robust programmable control devices that may be utilized for carrying out the disclosed techniques.

Storage device 714 may store media (e.g., image and video files), software (e.g., for implementing various functions on device 700), preference information, device profile information, and any other suitable data. Storage device 714 may include one more non-transitory storage mediums for tangibly recording image data and program instructions, including for example, a hard-drive, a solid-state storage device, permanent memory such as ROM, semi-permanent memory such as RAM, or cache. Program instructions may comprise a software implementation encoded in any desired language (e.g., C or C++).

Memory 712 may include one or more different types of memory which may be used for performing device functions. For example, memory 712 may include cache, ROM, and/or RAM. Communications bus 722 may provide a data transfer path for transferring data to, from, or between at least storage device 714, memory 712, and processor 716. Although referred to as a bus, communications bus 722 is not limited to any specific data transfer technology. User interface 718 may allow a user to interact with the electronic device 700. For example, the user interface 718 can take a variety of forms, such as a button, keypad, dial, a click wheel, or a touch screen.

The electronic device 700 may be a device such as such a mobile phone, personal data assistant (PDA), portable music player, monitor, television, laptop, desktop, and tablet computer, or other suitable personal device.

Figure 8:
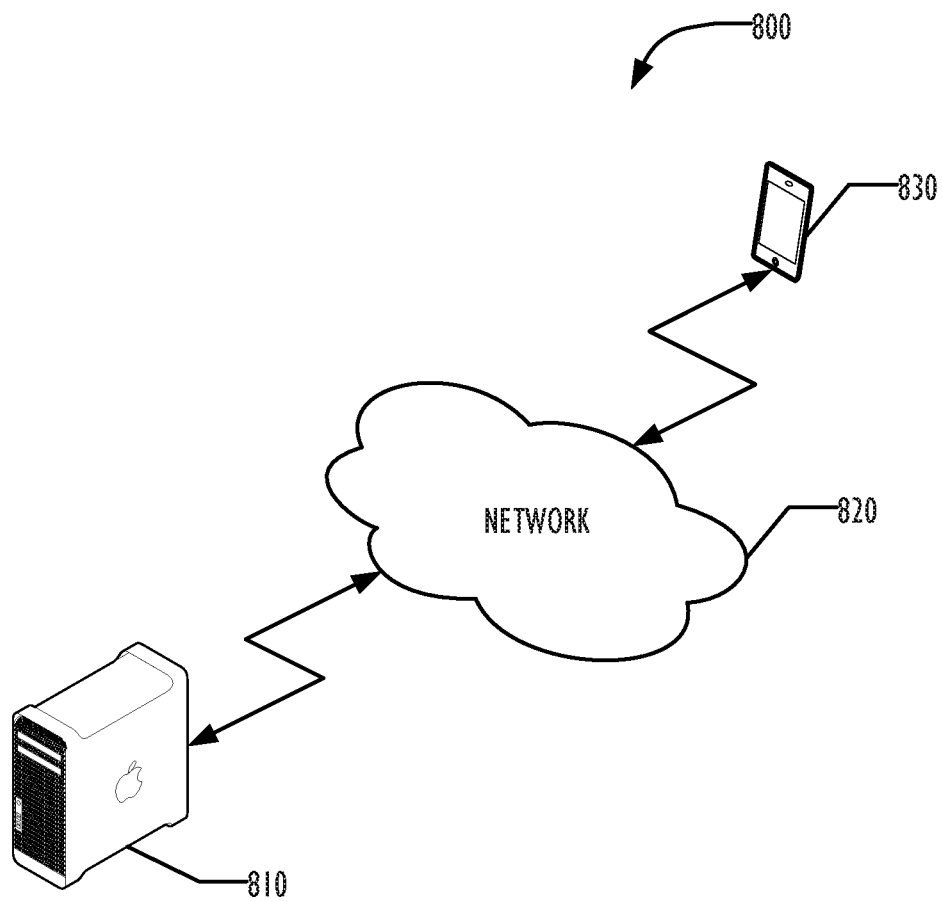
FIG. 8 is a block diagram illustrating a system of multiple devices for performing the techniques disclosed herein.

FIG. 8 illustrates a networked collection of programmable devices, including in this example a desktop computer 810 and a smart phone 830 connected by a network 820. Implementations may split the processing and storage of information related to the techniques described above between devices. For example, modifiable dictionaries used for storing and learning information about corrections made by the user on smart phone 830 during the post-send opportunity for correction may be stored in the cloud on the desktop computer 810 as desired. In addition, analysis of the textual data may be performed on the programmable device 830 on which the opportunity is displayed for the user, or may be performed on the programmable device 810, reducing the resources necessary on the programmable device 830, and possibly making the information stored on the programmable device 810 available to multiple programmable devices 810.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. At least one non-transitory program storage device, on which are stored computer instructions executable by one or more programmable control devices to:
    display a first user interface, wherein the first user interface includes (1) content associated with a message and (2) a first user interface element corresponding to an instruction to send the message;
    in accordance with a determination that (1) an input has been received activating the first user interface element and (2) the message includes an uncorrected error, temporarily display, within the first user interface, a second user interface element for a predetermined time period before sending the message, the second user interface element, when activated, causes a display of a second user interface;
    in accordance with a determination that the second user interface element has been selected within the predetermined time period, display the second user interface in place of the first user interface, the second user interface including a third user interface element for replacing the uncorrected error prior to sending the message; and
    in response to a determination that the third user interface element has been selected, modify or replace the uncorrected error, and send the message.

2. The at least one non-transitory program storage device of claim 1, wherein the second user interface element is displayed concurrently with the content.

3. The at least one non-transitory program storage device of claim 1, wherein the content is input by a user.

4. The at least one non-transitory program storage device of claim 1, wherein the computer instructions are further executable by the one or more programmable control devices to, in accordance with a determination to send the message, send the message.

5. The at least one non-transitory program storage device of claim 4, wherein the determination to send the message includes determining that the third user interface element has been selected.

6. The at least one non-transitory program storage device of claim 1, wherein the computer instructions are further executable by the one or more programmable control devices to, in accordance with a determination that an amount of time has expired since the activation of the first user interface element, remove the second user interface element from the first user interface.

7. The at least one non-transitory program storage device of claim 1, wherein the computer instructions are further executable by the one or more programmable control devices to, in accordance with a determination that an input has been received activating the third user interface element, modify the message.

8. The at least one non-transitory program storage device of claim 1, wherein the computer instructions are further executable by the one or more programmable control devices to, wherein the third user interface element corresponds to a suggested correction for the uncorrected error.

9. The at least one non-transitory program storage device of claim 1, wherein the second user interface includes one or more suggested corrections for the uncorrected error.

10. The at least one non-transitory program storage device of claim 1, wherein the computer instructions are further executable by the one or more programmable control devices to, in accordance with a determination that the message has been sent, replace the second user interface with the first user interface.

11. The at least one non-transitory program storage device of claim 1, wherein the computer instructions are further executable by the one or more programmable control devices to:
    maintain a timer of time remaining before the second user interface element is to be removed from the first user interface;
    display a representation of the timer in the first user interface;
    stop the timer in response to the determination that the second user interface element has been selected; and
    display a representation of the stopped timer in the second user interface.

12. The at least one non-transitory program storage device of claim 1, wherein the computer instructions are further executable by the one or more programmable control devices to display, within the first user interface, a fourth user interface element, wherein selection of the fourth user interface element causes the second user interface element to be removed from the first user interface.

13. The at least one non-transitory program storage device of claim 1, wherein in accordance with a determination that the second user interface element has not been selected within the predetermined time, forgo display of the second user interface and send the message including the uncorrected error.

14. A method comprising:
    displaying a first user interface, wherein the first user interface includes (1) content associated with a message and (2) a first user interface element corresponding to an instruction to send the message;
    in accordance with a determination that (1) an input has been received activating the first user interface element and (2) the message includes an uncorrected error, temporarily displaying, within the first user interface, a second user interface element for a predetermined time period before sending the message, the second user interface element, when activated, causes a display of a second user interface;
    in accordance with a determination that the second user interface element has been selected within the predetermined time period, displaying the second user interface in place of the first user interface, the second user interface including a third user interface element for replacing the uncorrected error prior to sending the message; and
    in response to a determination that the third user interface element has been selected, modifying or replacing the uncorrected error, and sending the message.

15. The method of claim 14, wherein the second user interface element is displayed concurrently with the content.

16. The method of claim 14, further comprising generating the content based on user input.

17. A device comprising:
    one or more programmable control devices; and at least one non-transitory program storage device storing instructions executable by the one or more programmable control devices to:

display a first user interface, wherein the first user interface includes (1) content associated with a message and (2) a first user interface element corresponding to an instruction to send the message;

in accordance with a determination that (1) an input has been received activating the first user interface element and (2) the message includes an uncorrected error, temporarily display, within the first user interface, a second user interface element for a predetermined time period before sending the message, the second user interface element, when activated, causes a display of a second user interface;

in accordance with a determination that the second user interface element has been selected within the predetermined time period, display the second user interface in place of the first user interface, the second user interface including a third user interface element for replacing the uncorrected error prior to sending the message; and in response to a determination that the third user interface element has been selected, modify or replace the uncorrected error, and send the message.

* * * * *